(12) United States Patent
Henderson et al.

(10) Patent No.: US 6,507,644 B1
(45) Date of Patent: Jan. 14, 2003

(54) PRE-PAID TELEPHONE CALLING CARD LINKED TO A STORED VALUE ACCOUNT

(75) Inventors: Karl Henderson, Highland Village, TX (US); David Ford, Brentwood, TN (US); James Duke Bond, Allen, TX (US); Kamran Mir, Plano, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/327,727

(22) Filed: Jun. 8, 1999

(51) Int. Cl.[7] .............................................. H04M 15/00
(52) U.S. Cl. ................ 379/114.2; 379/114.17; 379/114.21
(58) Field of Search ................ 379/114, 144, 379/112, 91.01, 115, 127, 130, 120, 121, 114.2, 114.15, 114.17, 114.18, 114.21; 235/380

(56) References Cited

U.S. PATENT DOCUMENTS

| | | | | |
|---|---|---|---|---|
| 5,353,335 A | * | 10/1994 | D'Urso et al. | 379/144 |
| 5,577,109 A | * | 11/1996 | Stimson et al. | 379/144 |
| 5,621,787 A | * | 4/1997 | McKoy et al. | 379/144 |
| 5,721,768 A | * | 2/1998 | Stimson et al. | 379/114 |
| 5,825,863 A | * | 10/1998 | Walker | 379/144 |
| 5,828,740 A | * | 10/1998 | Khuc et al. | 379/144 |
| 5,909,486 A | * | 6/1999 | Walker et al. | 379/144 |
| 5,915,007 A | * | 6/1999 | Klapka | 379/144 |
| 5,991,380 A | * | 11/1999 | Bruno et al. | 379/115 |
| 6,000,608 A | * | 12/1999 | Dorf | 235/380 |
| 6,115,458 A | * | 9/2000 | Taskett | 379/144 |

* cited by examiner

*Primary Examiner*—Rexford Barnie

(57) ABSTRACT

Systems and methods for facilitating the use of a pre-paid card linked to a stored value card account (e.g., a debit type card associated with an available, remaining money value, etc.). The system and method include and involve a data storage system for storing data related to a pre-paid card and a stored value card account. The stored value card account is maintained and managed by a stored value card processing system. The stored value card processing system stores a money value applicable to purchases and telephone calls. The system and method also include and involve a pre-paid telephone calling card processing system that is coupled to the data storage system and is configured to receive a request to initiate a telephone call in relation to the prepaid telephone calling card and to instruct the stored value card processing system to adjust the money value in relation to the telephone call.

17 Claims, 16 Drawing Sheets

PRE-PAID TELEPHONE CALLING CARD LINKED TO A STORED VALUE ACCOUNT

FIELD OF THE INVENTION

The present invention relates to systems and methods that are used to facilitate enhanced services related to pre-paid telephone calling cards and, more specifically, to systems and methods for debit or stored value account calling cards.

DESCRIPTION OF THE RELATED ART

It is well known that pre-paid telephone calling cards ("pre-paid cards") have become widely used to obtain telephone calling services such as long distance calling services, etc. Consumers can purchase pre-paid cards from retail stores and use the same to obtain access to telephone services to call friends and family all over the world. As such, many different kinds of pre-paid cards are now available. Consumers can purchase pre-paid cards having a variety of calling options (domestic calling options, international calling options, etc.) and a wide selection of pre-paid values. For example, consumers can purchase domestic-use calling cards that are charged with 100 domestic call units (i.e., a unit is typically equal to one telephone service minute, but may be associated with some other amount of time—e.g., 50 seconds, etc.).

The appeal of pre-paid cards to consumers is due in large part to the fact that pre-paid telephone calling cards often allow consumers to realize savings associated with making telephone calls. For example, pre-paid cards often allow consumers to avoid the costs associated with using a conventional telephone calling card that is associated with a particular telephone line (e.g., an access call service charge that is added to other toll-call rates and charges). As a result of their appeal, many retailers have begun to offer and sell pre-paid cards. Since a relatively large selection of pre-paid cards can be stocked and displayed without requiring significant retail floor space, retailers can enjoy maximized revenues relative to small sections of their leased or owned storefronts.

Despite the appeal of pre-paid cards to both consumers and retailers, such market acceptance has created serious problems for providers of pre-paid cards and related telephone services. In particular, providers of pre-paid cards have been forced to distinguish their products in order to effectively compete. To date, the only effective way to distinguish one's pre-paid cards has been to continuously lower telephone service rates to the point of extremely thin or negative margins. And, unfortunately, pre-paid cards that promise the "lowest" telephone service rates often are not sufficient to capture and retain pre-paid card customers.

Another type of card often sold/distributed by retailers is a debit type card that has become known as a "stored value card." A consumer can purchase a designated value type card or "pre-load" an amount of money onto an existing card that can be used to buy goods and services. Such debit type cards have become quite popular, especially at convenience markets, etc. to allow consumers a quicker way to pay. Unfortunately, however, there is no current way to combine the benefits of pre-paid cards with those of stored value cards in a single general-use type debit card. As such, consumers must purchase two different debit type cards to engage in debit transactions such as product sales and to obtain telephone services.

Thus, there exists a need to provide systems and methods that will allow providers of pre-paid and stored value cards to offer enhanced services in relation to such cards without requiring telephone service providers to lower their telephone service rates to unreasonable levels. To be viable, such systems and methods must allow users of pre-paid cards to easily take advantage of such enhanced services while, at the same time, using pre-paid cards to obtain conventional telephone calling services and to buy products and services by linking such pre-paid cards to corresponding enhanced services.

SUMMARY

The present invention solves the above-described problems associated with pre-paid telephone calling cards by providing systems and methods that facilitate the provisioning, processing, and use of enhanced services in relation to pre-paid telephone calling cards.

By providing such systems and methods, providers of pre-paid telephone calling cards will be able to effectively compete in the pre-paid card marketplace by offering better, more feature-rich services that consumers will rely on and come to enjoy. In particular, such systems and methods may be used to provide enhanced services to card purchasers who wish to utilize a pre-paid telephone calling card that is associated or linked to a stored value account (e.g., a stored value account often associated with a stored value type card or debit type card). In accordance with the present invention, a pre-paid card customer may purchase a pre-paid telephone calling/stored value card and, upon first use of the same, be prompted to obtain long distance telephone services or to purchase goods and services at a retail point of sale.

In accordance with the present invention, provided are systems and methods for facilitating the use of a pre-paid telephone calling/stored value card linked to a stored value card account (e.g., a debit type card associated with an available remaining money value, etc.). These systems and methods include and involve a data storage system for storing data related to a prepaid telephone calling/stored value card and a stored value card account. The stored value card account is maintained and managed by a stored value card processing system. The stored value card processing system stores a money value applicable to purchases and telephone calls. The systems and methods also include and involve a pre-paid telephone calling card processing system that is coupled to the data storage system and is configured to receive a request to initiate a telephone call and to instruct the stored value card processing system to adjust the money value in relation to the telephone call.

BRIEF DESCRIPTION OF THE DRAWINGS

FIG. 2I–1 is a continuation call flow diagram of the call flow diagram started in FIGS. 2A–2H.

FIG. 2I–2 is a continuation call flow diagram of the call flow diagram started in FIGS. 2A–2I–1.

DETAILED DESCRIPTION

Figure 1:
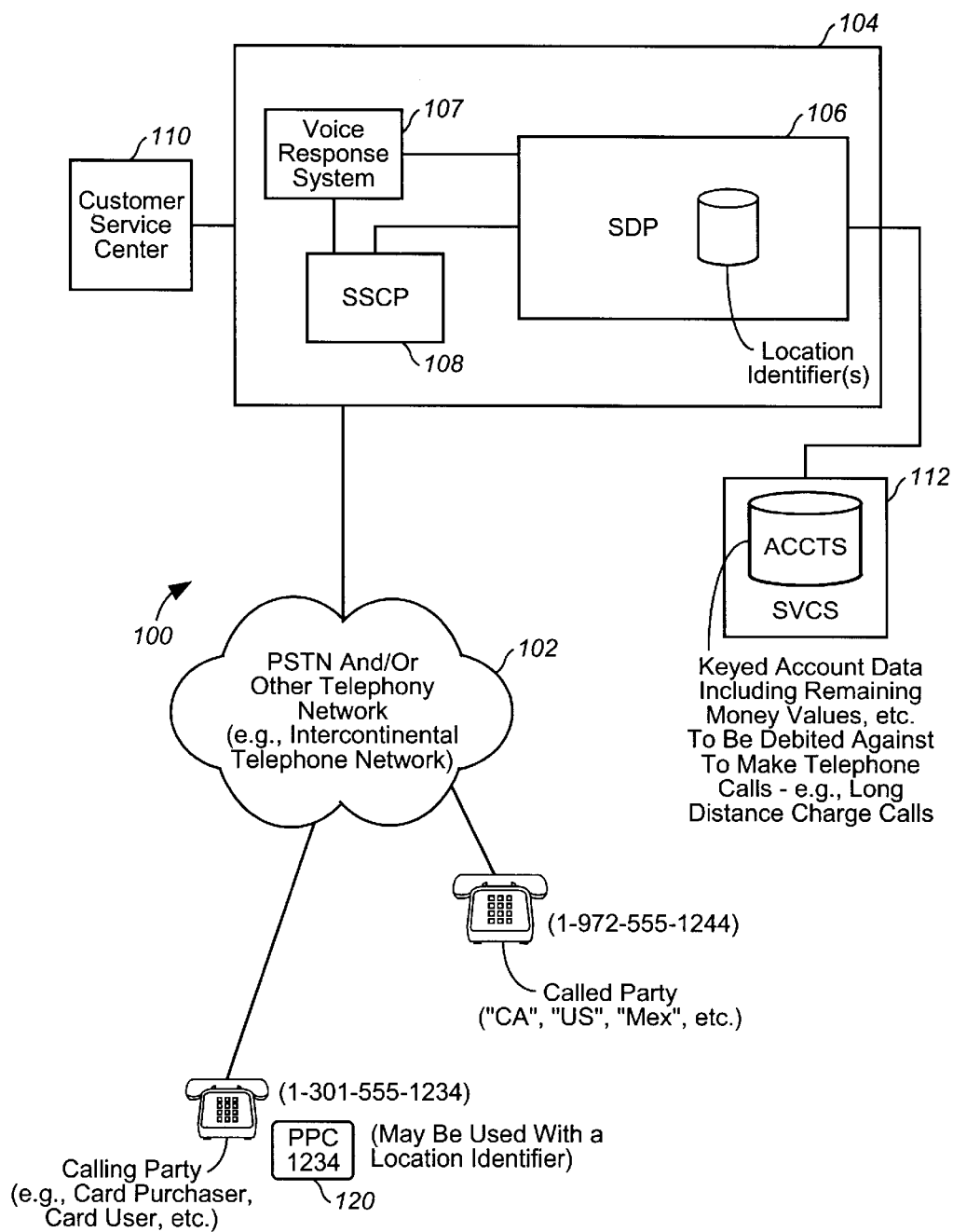
FIG. 1 is a diagram of a system in which enhanced services may be provided in conjunction with pre-paid telephone calling/stored value cards according to a preferred embodiment of the present invention.

The fact that the term "pre-paid" appears before "stored value" in relation to the name of a particular card discussed herein has no limiting effect on the present invention. To the contrary, a card that may be used as a pre-paid card in the context of the present invention may be one that is initially purchased as a stored value card which is "loaded with money" at a point of sale and which is initially intended to be used to purchase goods and services. It is the present invention that now allows both types of functionality (i.e., that of a pre-paid telephone calling card and that of a stored value card) to be combined into a single debit instrument. Accordingly, a card provided in the context of the present invention could also be referred to as a "stored value/pre-paid" card or an "enhanced pre-paid" card.

The present invention is concerned with providing systems and methods that may be used to provide enhanced pre-paid card services and features. Such enhanced services and features include and involve systems and methods that are provided by the present invention to deliver pre-paid telephone calling/stored value cards (hereinafter "pre-paid/stored valued cards") that may be used in conjunction with corresponding stored value card accounts to obtain long distance (e.g., charge calls, etc.) and other telephony services. With such enhanced pre-paid cards and related services, people will be able to purchase a stored value card that may be used to obtain telephone call services in addition to obtaining products and other services purchased at retail establishments.

Moreover, the present invention will allow data stored and processed within stored value card systems to be used in making telephone calls (e.g., charge calls, etc.). For example, the present invention will allow a purchaser of a stored value type card (e.g., a debit card, etc.) to be used to make telephone calls, etc.

To facilitate the provisioning of the enhanced pre-paid card that is associated with a stored value card account (e.g., one maintained by a stored value card processor, etc.), the present invention includes two phases of operation that are discussed in detail below with regard to FIGS. 1 and 2A–2N. A first phase involves enhanced pre-paid card activation and feature setup, while a second phase includes enhanced pre-paid card use. The first phase, enhanced prepaid card activation and feature setup, may involve the actions of a seller/distributor of the enhanced pre-paid card in conjunction with the actions of a card purchaser. Enhanced pre-paid card feature setup involves the actions of a card purchaser who, by way of the present invention, is now able to engage in a setup type call to a pre-paid card processing system to initiate his enhanced pre-paid card.

The aforementioned second phase, card use, may involve the actions of the card purchaser or other party (e.g., a card user, etc.) who seeks to make a telephone call through use of the enhanced pre-paid card (or someone who seeks to receive the benefit of some other enhanced pre-paid card related service—e.g., pre-paid network service such as pre-paid Internet access, pre-paid cellular service, etc.).

To deliver the aforementioned enhanced services/features and, in particular, the ability to allow a stored value type card to be used to obtain telephone call services, the present invention utilizes systems and corresponding processes that are now described. In particular, the structural aspects of the present invention are described with reference to FIG. 1. Depicted in FIG. 1 is a system 100 that supports enhanced pre-paid cards, such as those that may be set up to correspond to stored value card accounts in accordance with the present invention. In particular, system 100 includes a calling party (e.g., having telephone number 301-993-1234); a called party (e.g., having telephone number 972-918-1244); the publicly switched telephone network (PSTN) 102 and/or other telephony network including, but not limited to, an intercontinental telephone network, the Internet, etc.; a pre-paid telephone calling card processing system 104, including at least one intelligent network platform having one or more service data points (SDP) 106, at least one service switching control point (SSCP) 108; and a customer service center 110, which may be attended by live operators. System 100 also includes stored value card processing systems (SVCS) 112 that may be maintained and operated by a stored value card processor, such as those operated by Stored Value Systems, Inc.

In FIG. 1, calling party (e.g., a card purchaser, card user, etc.) may use a pre-paid/stored value card 120 to obtain enhanced pre-paid telephone calling card services in accordance with the present invention (such as telephone call services to a particular location) at reduced or discounted rates, which may be less than normally charged full and otherwise reduced telephone service rates.

Also included within pre-paid telephone calling card processing system 104 is a voice response system 107 that may be used to automatically voice prompts and/or recorded messages/greetings in accordance with the present invention via a telephone call (e.g., a setup call during which one or more location identifiers may be received and recorded automatically, etc.) over a telephone network such as the PSTN 102. The use of such voice response systems will be readily apparent and understood by those skilled in the art. The use of a voice response system to facilitate voicing of digitally recorded voice sequences, such as prompts for information and data entry, will be readily understood by those skilled in the art.

System 100 facilitates both card feature setup (e.g., card activation and initiation, etc.) by a card purchaser, if needed for example, and card use by a card user. The pre-paid/stored value card 120 may be used to obtain long-distance telephone service or other services that may be offered in conjunction with a pre-paid type card (e.g., pre-paid Internet service, pre-paid cellular telephone service, etc.).

As noted above, pre-paid telephone calling card processing system 104 is one that includes at least one intelligent network platform having, among other things, one or more SSPs and one or more SCPs, which may be implemented in a common structure referred to herein as an SSCP 108, and SDP 106. As such, a card purchaser of pre-paid/stored value card 120 may access SSCP 108 via PSTN 102 to affect database records related to pre-paid calling cards like or similar to pre-paid/stored value card 120 in accordance with the present invention. It should also be noted that the present invention utilizes the functionality of, among other things, Service Data points (SDPs), Service Control points (SCP's) Service Switching points (SSPs), etc. The actual configuration and arrangement of structures within an intelligent network platform to deliver and provide such functionality may vary depending on available products and systems.

A card purchaser may setup pre-paid/stored value card 120 by causing the same to be flagged as "available" for use within SDP 106 during a first use of the same (e.g., during a first use setup telephone call). Data related to pre-paid/stored value card 120 may be stored in SDP 106. Such data may include card usage data such as: remaining minutes, unit billing rates, and conversion tables and rates related to available money values that may be maintained within stored value card processing systems SVCS 112, telephone numbers (e.g., special use telephone numbers like a home telephone number, etc.) along with reduced billing rates.

A card purchaser of pre-paid/stored value card 120 may cause data related to prepaid/stored value card 120 to be affected via a live operator session handled through customer service center 110. The facilities to support use of a customer service call center, ultimately to support pre-paid cards in accordance with the present invention will be readily apparent to those skilled in the art.

Once pre-paid/stored value card 120 has been setup in accordance with the present invention (e.g., caused to be flagged as "available" for use), a card user may place a pre-paid telephone calling card call in a conventional way (e.g., by dialing a 1-800 access number and entering an appropriate card identified, such as a PIN/CARD ID number) to obtain long distance telephone service, etc. In accordance with the present invention, however, the card user may realize reduced, discounted telephone service rates in relation to calls made and based on available money values maintained by SVCS 112. That is, the present invention now allows stored values and, in particular, stored money values to be used to purchase goods and services, such as at retail counters (e.g., Point of Sale, etc.) and telephone service units (e.g., minutes, etc.) to make telephone calls (e.g., charge type calls, etc.).

SVCS 112 is a conventional stored value card system that stores money values relative to card accounts that may be used by stored value card purchasers to obtain goods or services, such as from retail establishments that accept such debit type cards. Accordingly, SVCS 112 is equipped with banking components and functionality to setup, add, adjust, debit, and otherwise track remaining money values for individual stored value cards and related accounts. That is, SVCS 112 includes computing systems and software to facilitate processing and database operations related to stored value card accounts, for which available money amounts may be tracked and debited, etc. The present invention allows such stored money values (e.g., remaining money values) to be used to make telephone calls and the like. In response to queries for remaining money values from SDP 106, SVCS 112 can provide messages including such remaining stored values. In turn, SDP 106 can now engage in simple arithmetic to compute telephone call usage unit balances based on tables, etc. to allow remaining money values to be used to make telephone calls (e.g., charge calls such as long distance calls, etc.). Upon termination and completion of a call, SDP 106 can, in turn, send a backwards computed money value message corresponding to telephone usage minutes used to make one or more telephone calls to SVCS 112 for appropriate tracking thereby.

SVCS 112 manages one or more databases of stored value account data. Such account data may be keyed data so that ready and quick queries against the same may be performed. For example, a card number may form the basis of a key as is done in SDP 106. Accordingly, the present invention contemplated keyed databases that may be accessed to retrieve particular table records (e.g., database table records, etc.) corresponding to particular stored value accounts (having associated spendable sums of money, etc.) and which may be updated or otherwise adjusted to reflect debits corresponding to telephone calls, such as charged type long distance calls. As such, a stored value card similar to a debit card, for example, may now be used to purchase goods and services (e.g., at a retail establishment, etc.) and to obtain access to telephony services such as long distance services.

A telephone call desired by a calling party (e.g., by a card user) may be placed from a calling party station such as one having telephone number 301-993-1234 to a called party in a particular location having a telephone terminal station identified at telephone number 972-918-1244.

The structures included and involved in the present invention as described above and as shown in FIG. 1, are designed to operate together to facilitate the phases of operation that were discussed above. In particular, the structures depicted in FIG. 1, which make up the system 100 are configured to support both pre-paid card activation and feature set-up as a first phase of operation and card use as a second phase of operation. Pre-paid card activation involves the operations related to data stored for pre-paid/stored value card 120 that may be stored in SDP 106 (FIG.1). Such activation operations, may include, but are not limited to, card activation, deactivation, re-charge of remaining minutes, and point-of-sale activation of the same. Such operations are intended to place a pre-paid card, like pre-paid/stored value card 120, into an active, ready-for-use state (e.g., ready to be used to make telephone calls in relation thereto, etc.). Pre-paid card activation may occur via a point-of-sale (POS) operation, a telephone session with a live operator, etc. Alternatively, if a stored value card is used, the same may be distributed and then later setup to be a pre-paid telephone calling card. An exemplary system to provide for activation operations related to pre-paid calling cards and is shown in co-pending U.S. patent application Ser. No. 09/089,815, filed Apr. 6, 1998, now abandoned, entitled "POINT OF SALE ACTIVATION AND DEACTIVATION OF PRE-PAID TELEPHONE CALLING CARDS," which is commonly assigned and incorporated herein by reference. The systems and call flows illustrated within the aforementioned United States Patent Application may be used to activate and deactivate (and otherwise affect data stored within SDP 106) to render a particular pre-paid card, such as pre-paid/stored value card 120, ready-for-use (e.g., ready to be used to make pre-paid card telephone calls such as long distance telephone calls) by a card user. And, in particular, such activation systems and call flows may be used to ready a card for use by a card user in accordance with the present invention.

After a card has been activated as described above, card features may be setup in accordance with the present invention. In particular, a pre-paid card may be setup during a first use (e.g., during a setup call, etc.) by causing the same to be ready for making telephone calls.

Figure 2A:
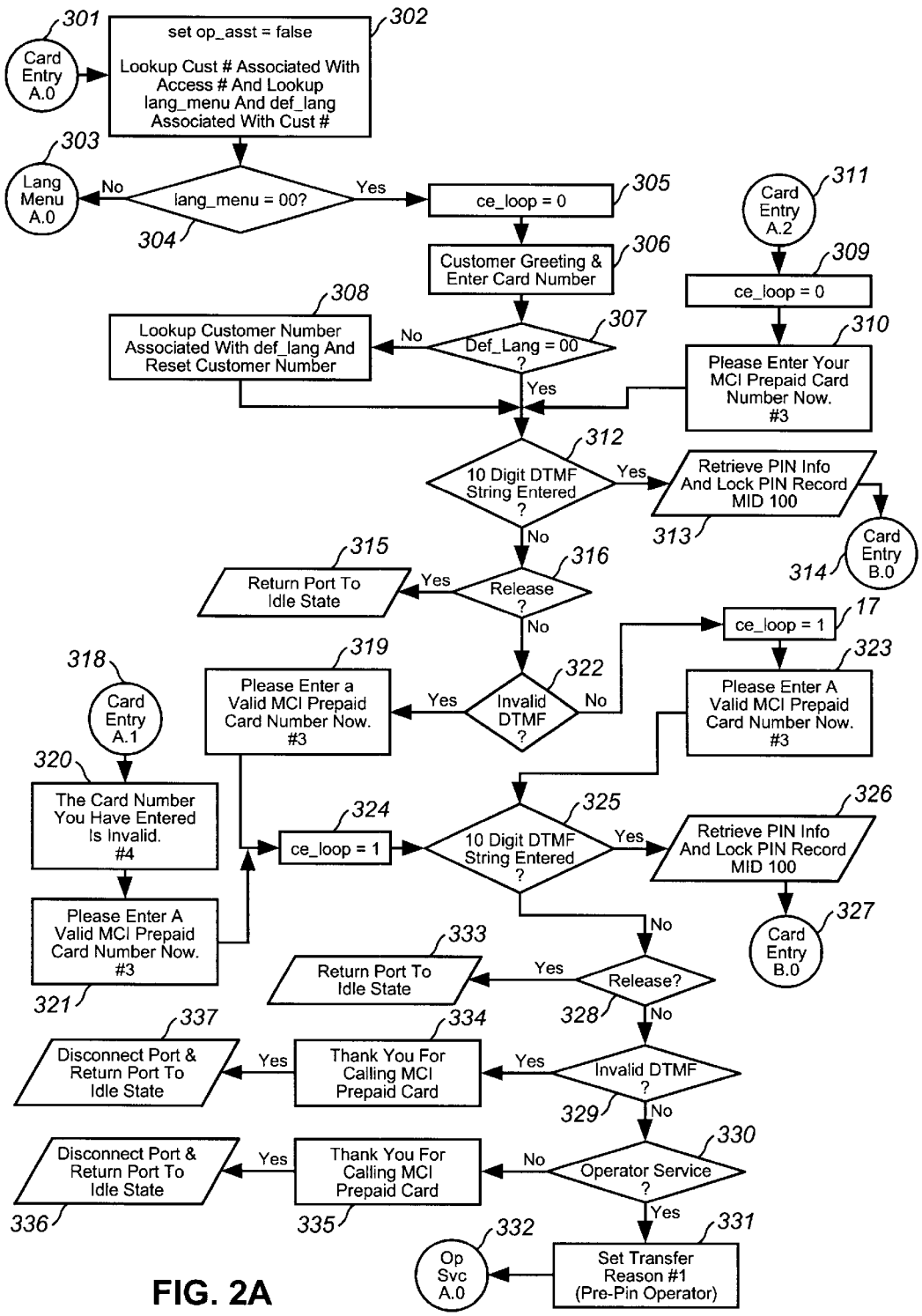
FIG. 2A is a call flow diagram that illustrates the operations carried out within the system depicted in FIG. 1 to allow use of a pre-paid telephone calling/stored value card and, in particular, one which may be used in conjunction with a linked stored value card account such as the type normally associated with a stored value card.
Figure 2B:
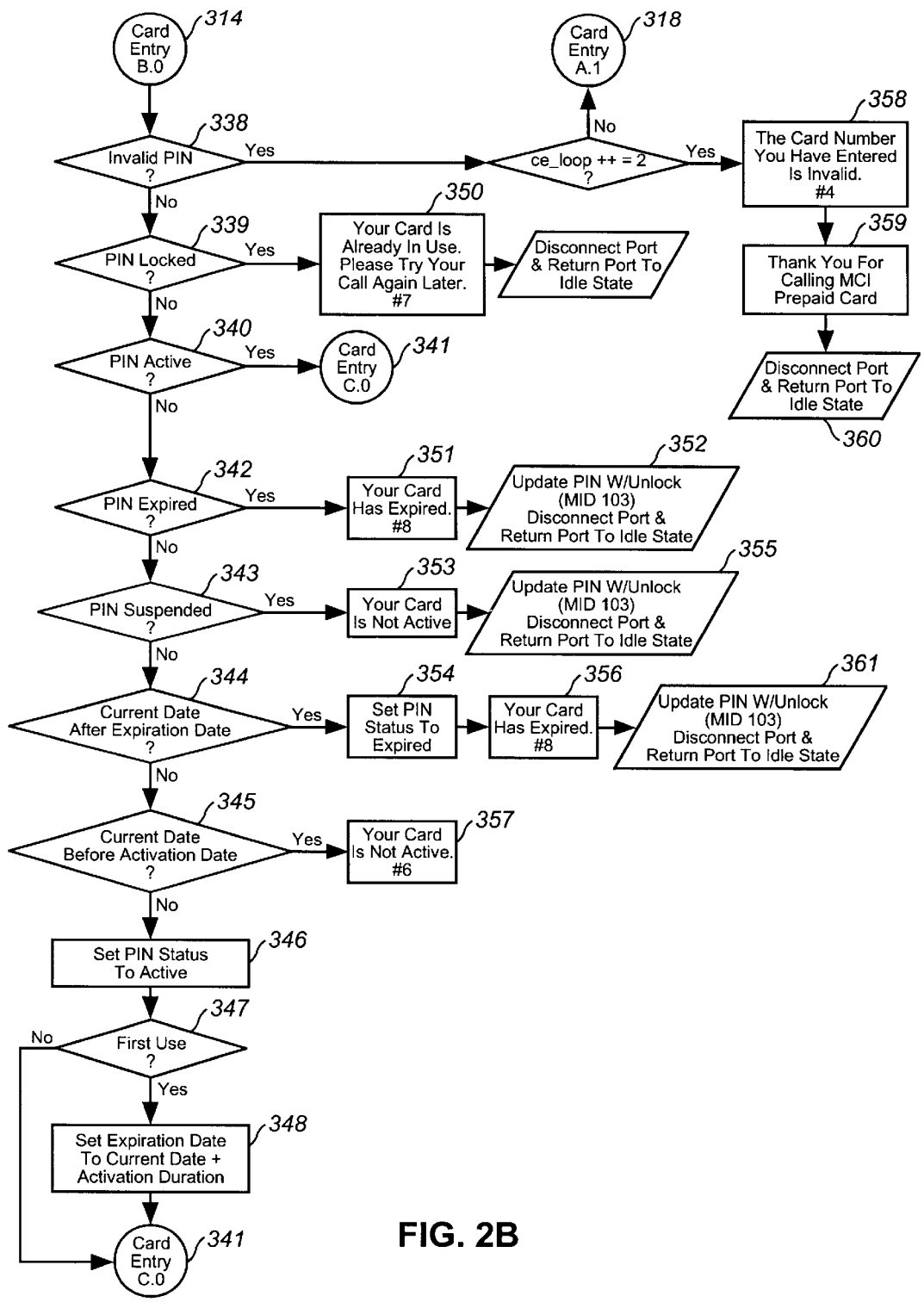
FIG. 2B is a continuation call flow diagram of the call flow diagram started in FIG. 2A.
Figure 2C:
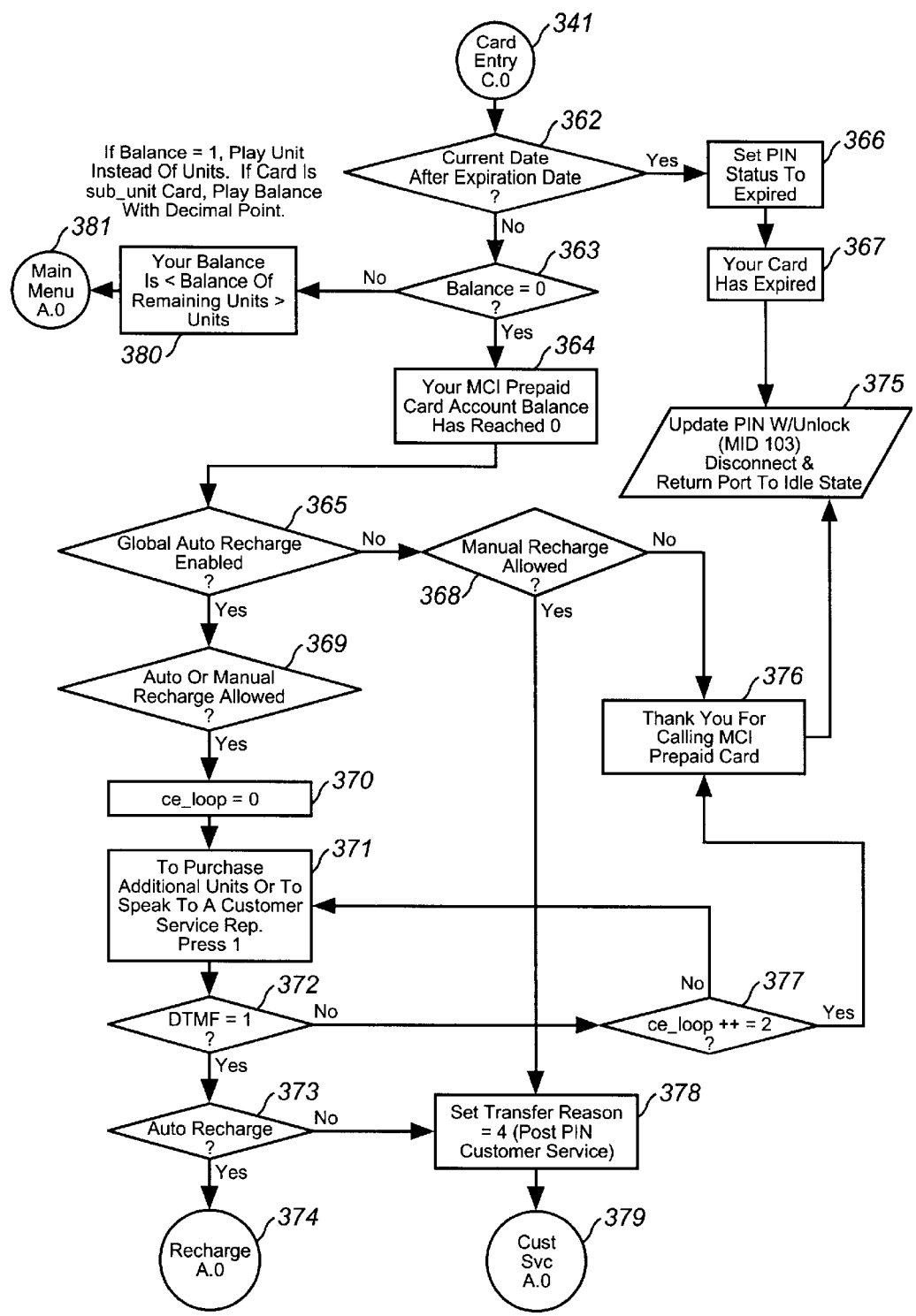
FIG. 2C is a continuation call flow diagram of the call flow diagram started in FIGS. 2A and 2B.
Figure 2D:
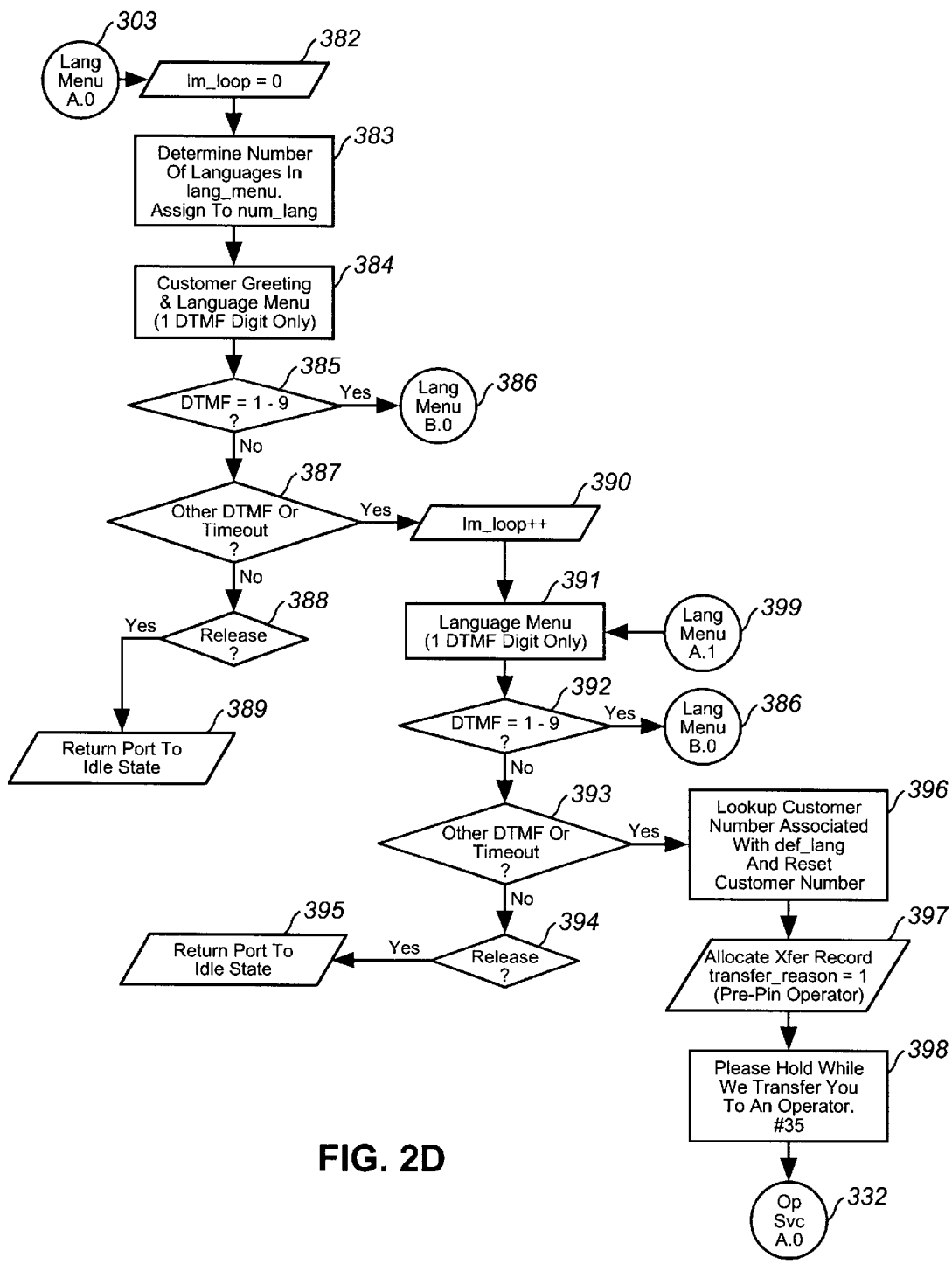
FIG. 2D is a continuation call flow diagram of the call flow diagram started in FIGS. 2A–2C.
Figure 2E:
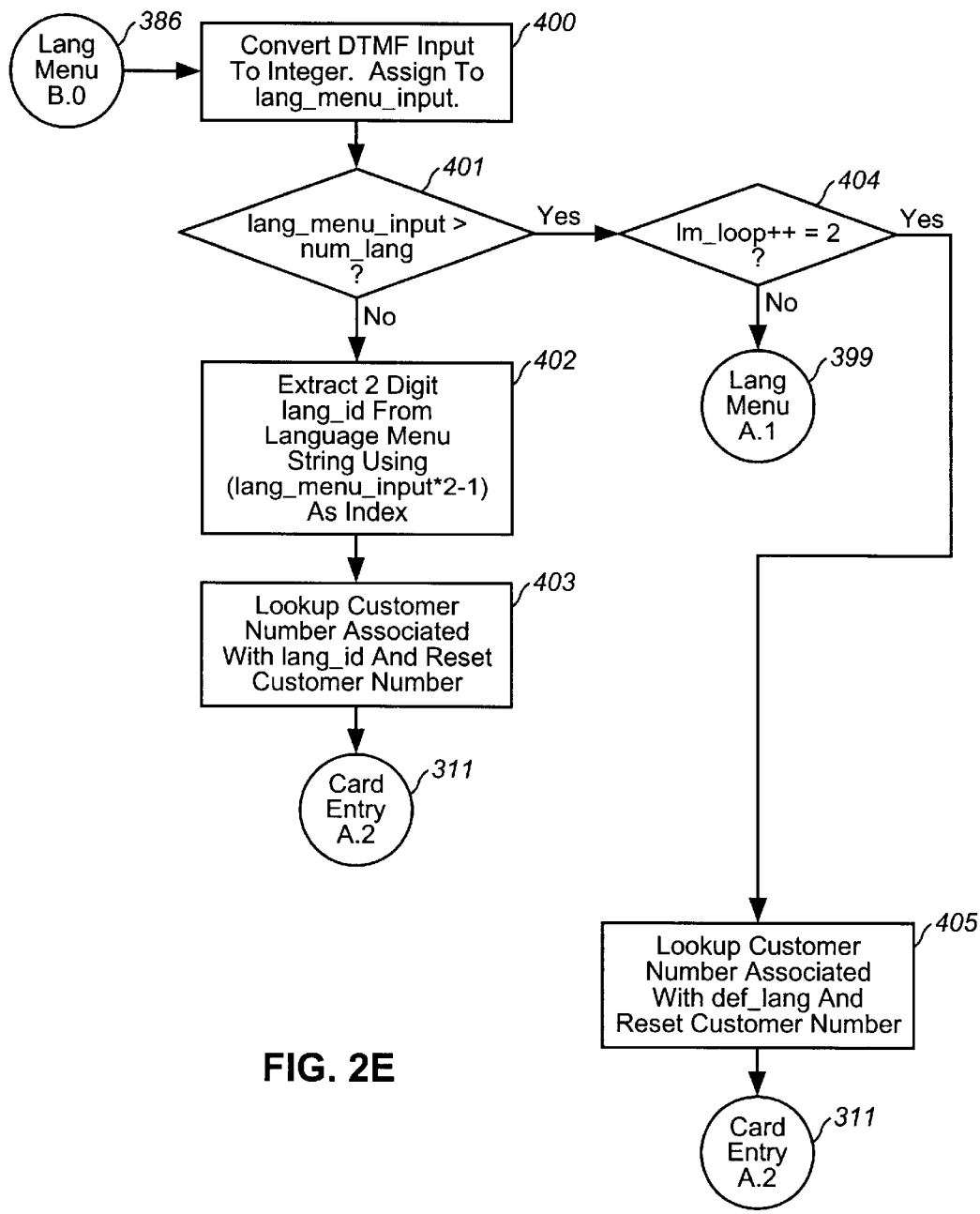
FIG. 2E is a continuation call flow diagram of the call flow diagram started in FIGS. 2A–2D.
Figure 2F:
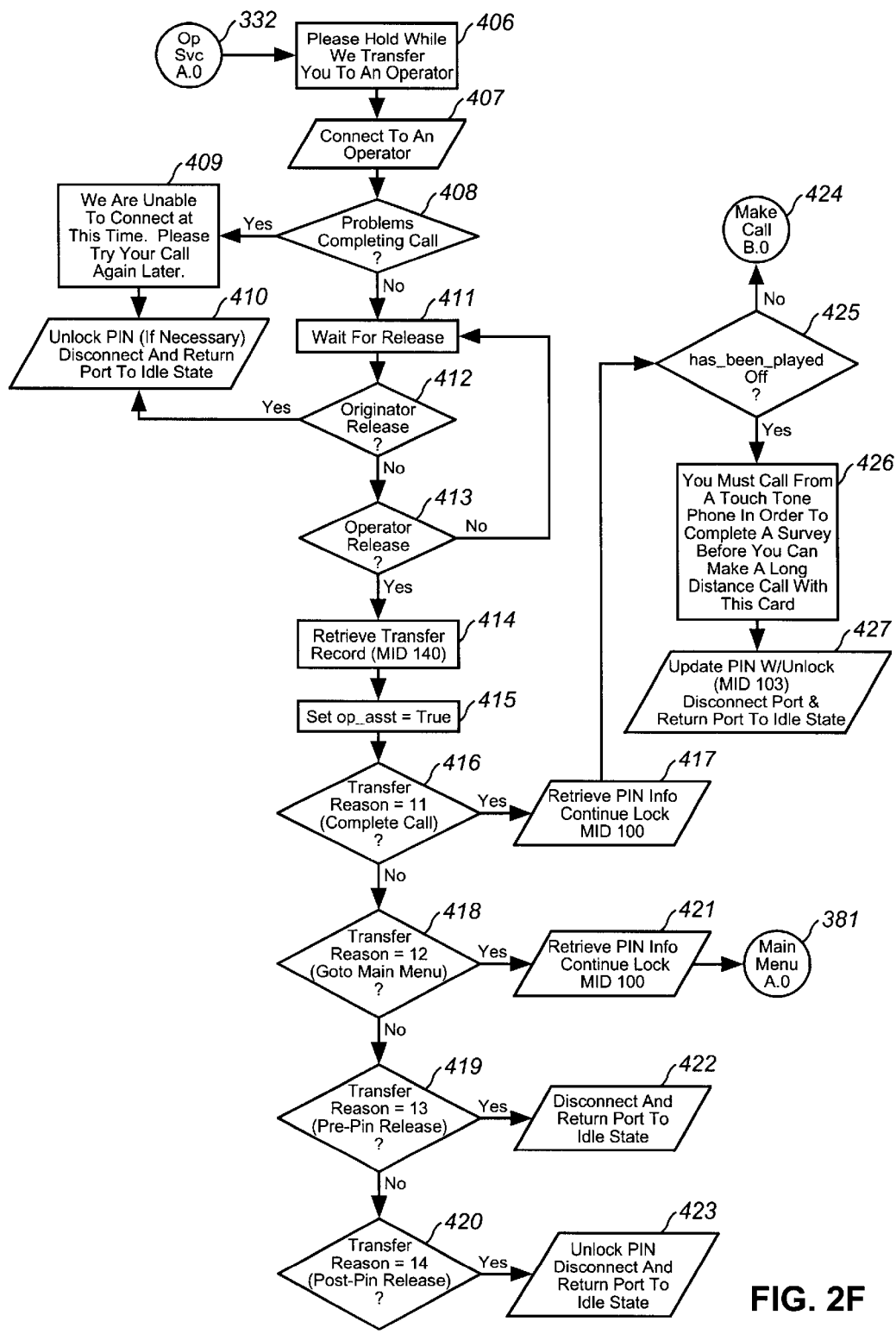
FIG. 2F is a continuation call flow diagram of the call flow diagram started in FIGS. 2A–2E.
Figure 2G:
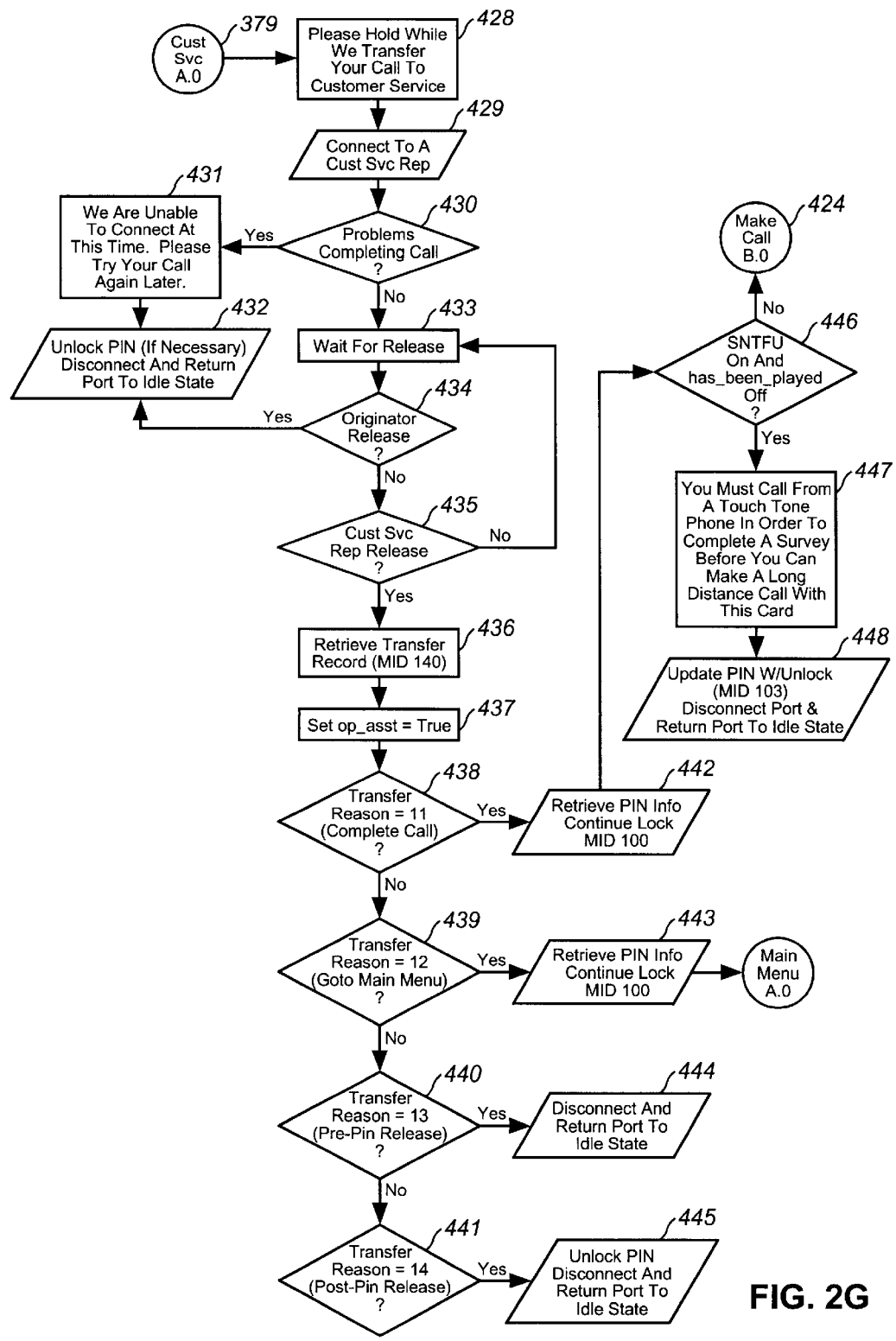
FIG. 2G is a continuation call flow diagram of the call flow diagram started in FIGS. 2A–2F.
Figure 2H:
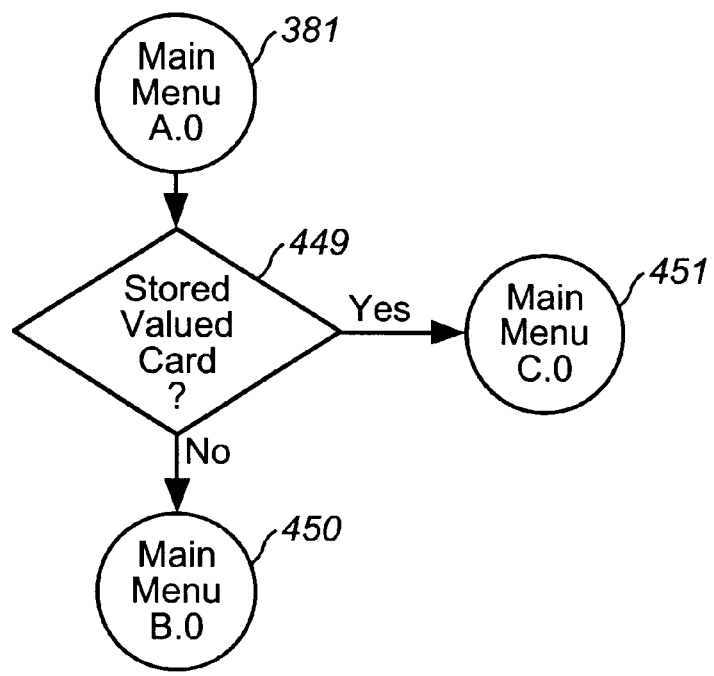
FIG. 2H is a continuation call flow diagram of the call flow diagram started in FIGS. 2A–2G.
Figures 1, 2I:
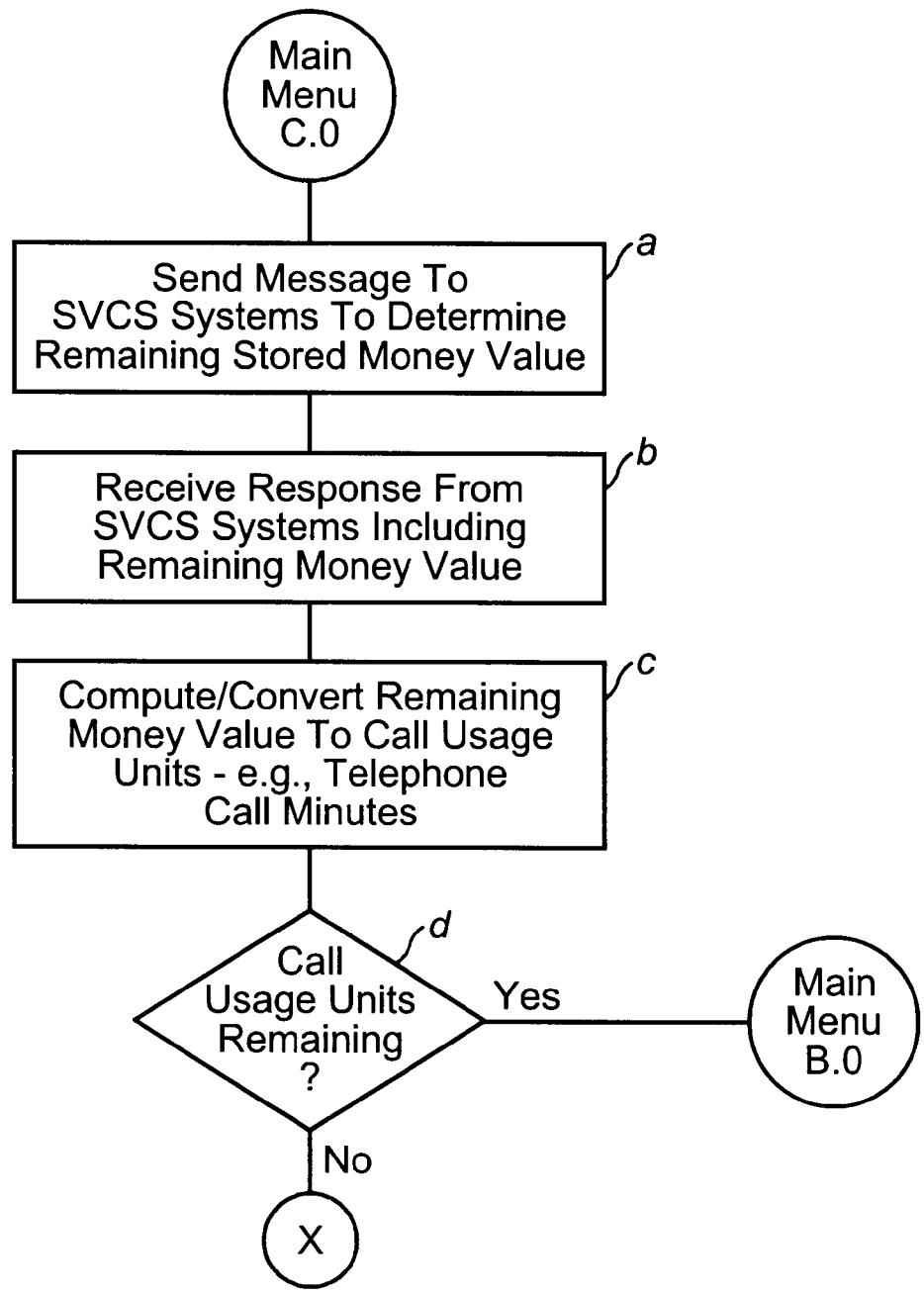
Figures 2, 2I:
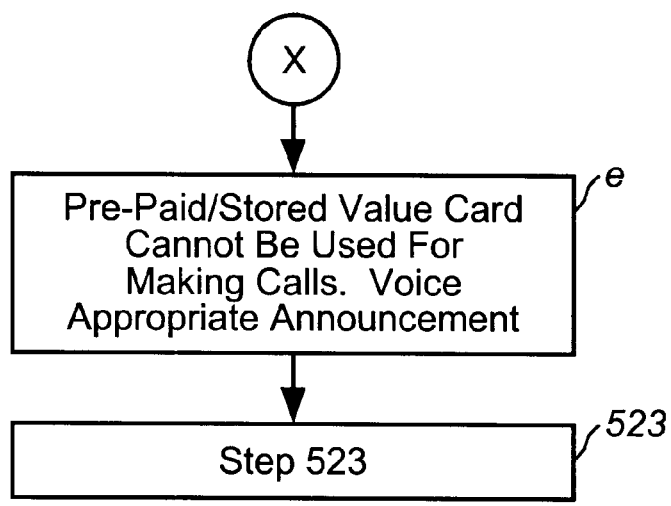
Figure 2J:
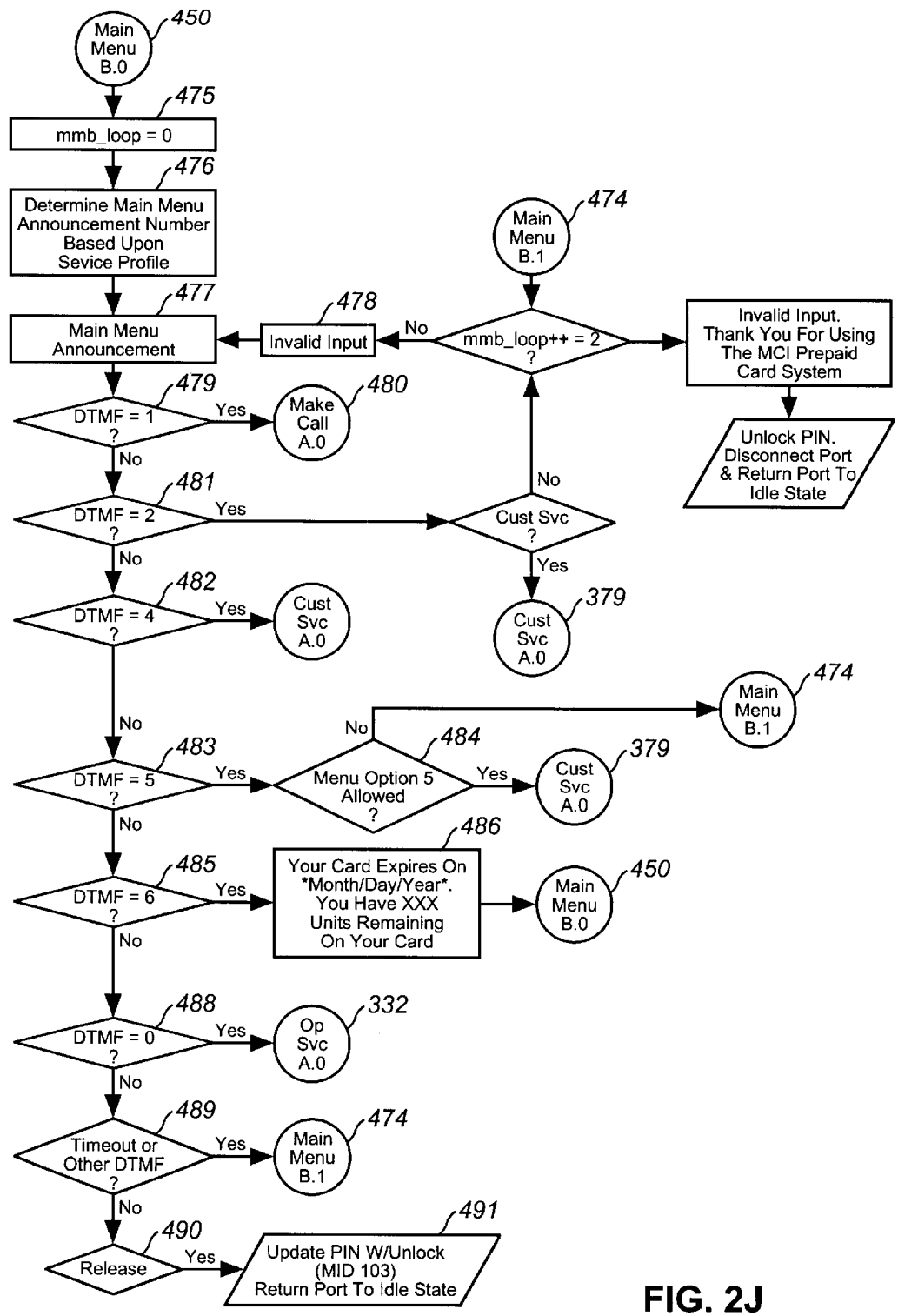
FIG. 2J is a continuation call flow diagram of the call flow diagram started in FIGS. 2A–2I–2.
Figure 2K:
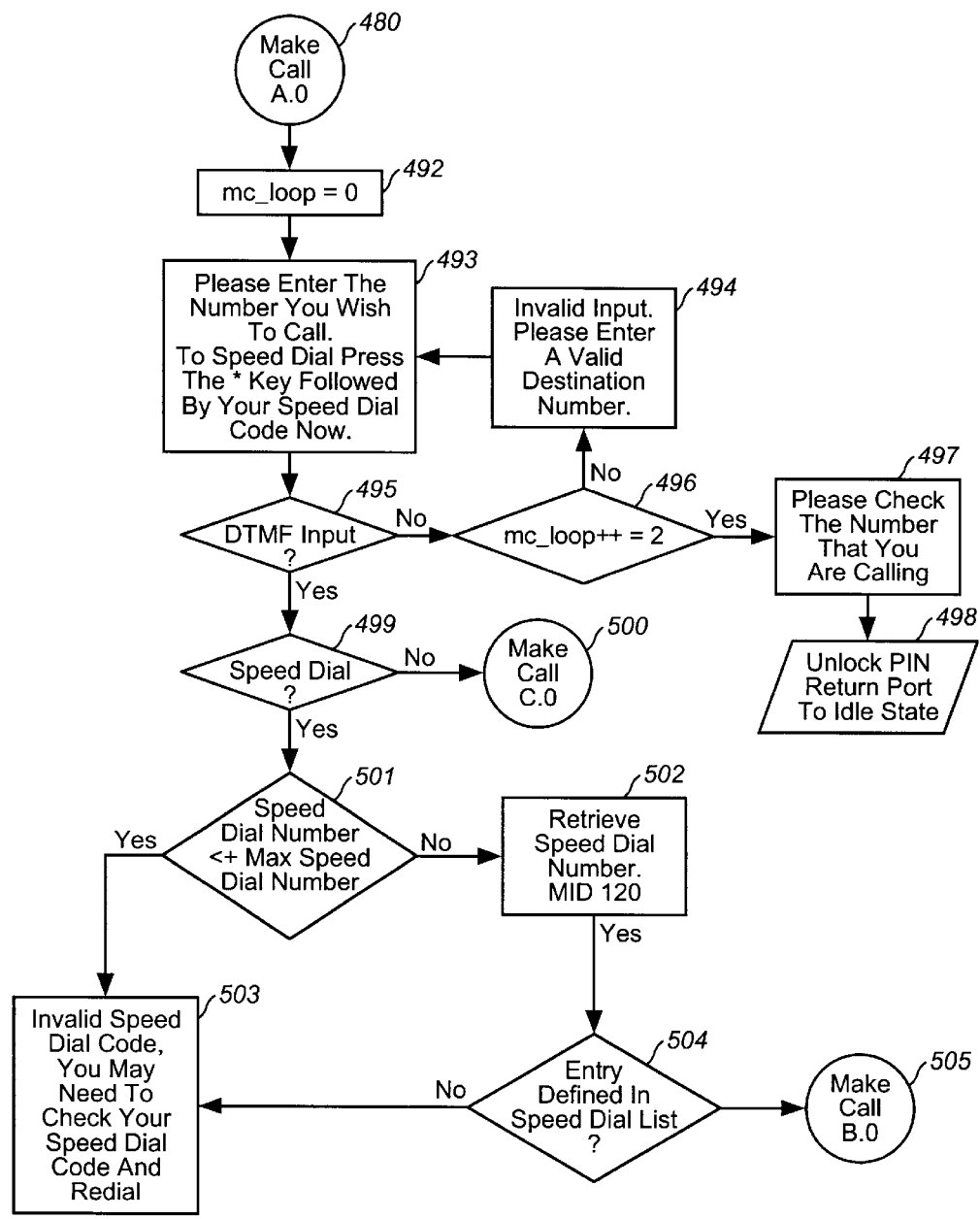
FIG. 2K is a continuation call flow diagram of the call flow diagram started in FIGS. 2A–2J.
Figure 2L:
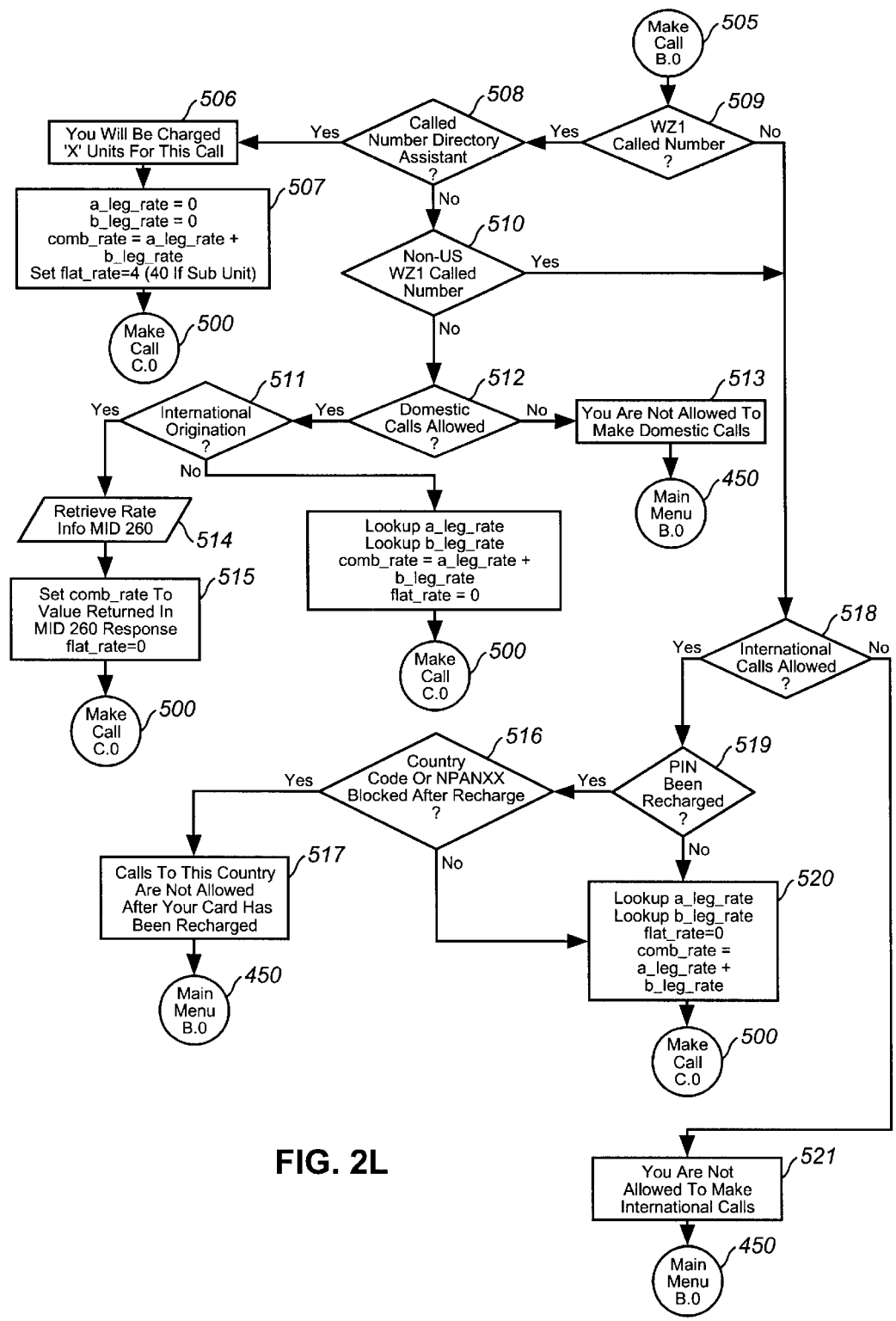
FIG. 2L is a continuation call flow diagram of the call flow diagram started in FIGS. 2A–2K.
Figure 2M:
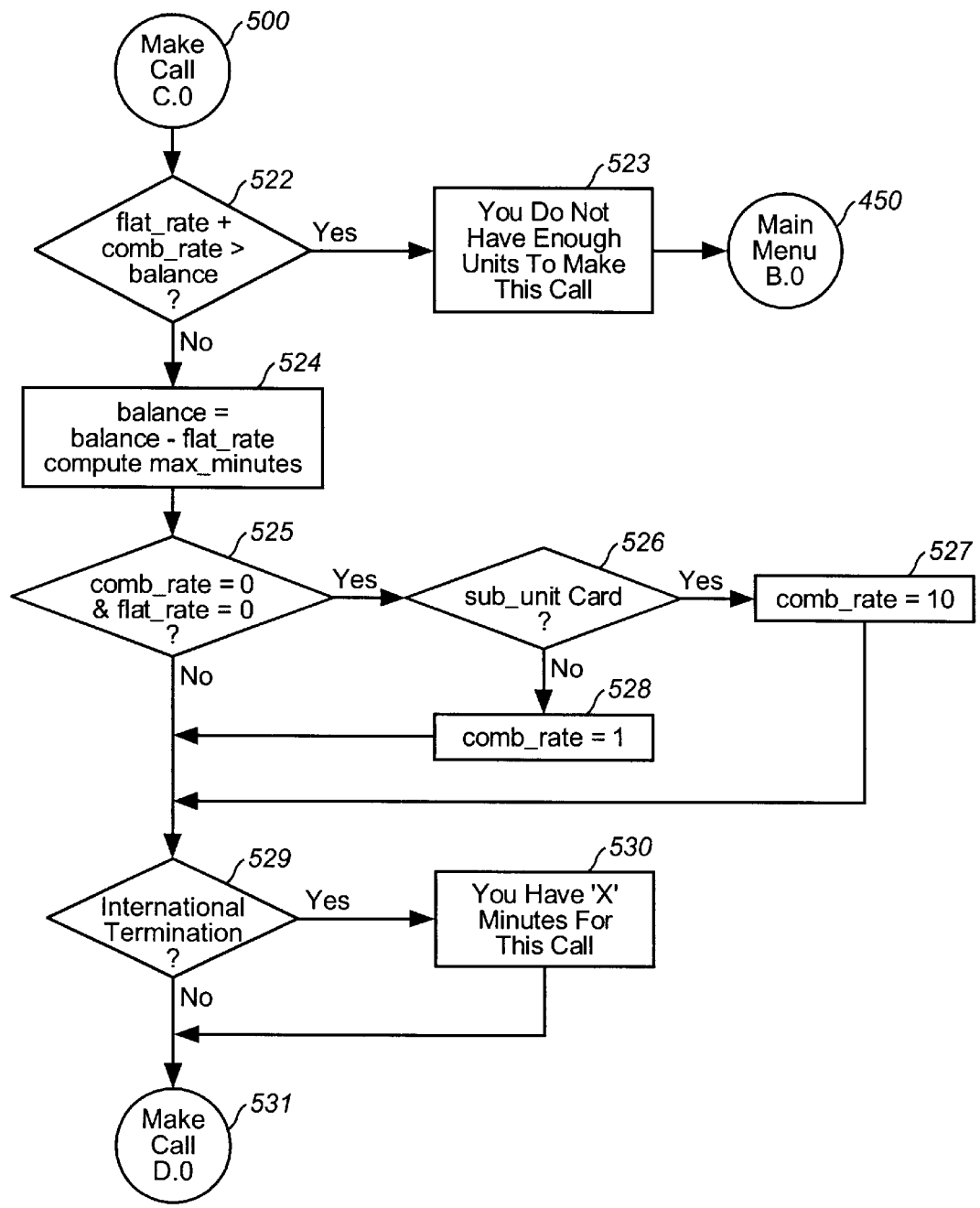
FIG. 2M is a continuation call flow diagram of the call flow diagram started in FIGS. 2A–2L.
Figure 2N:
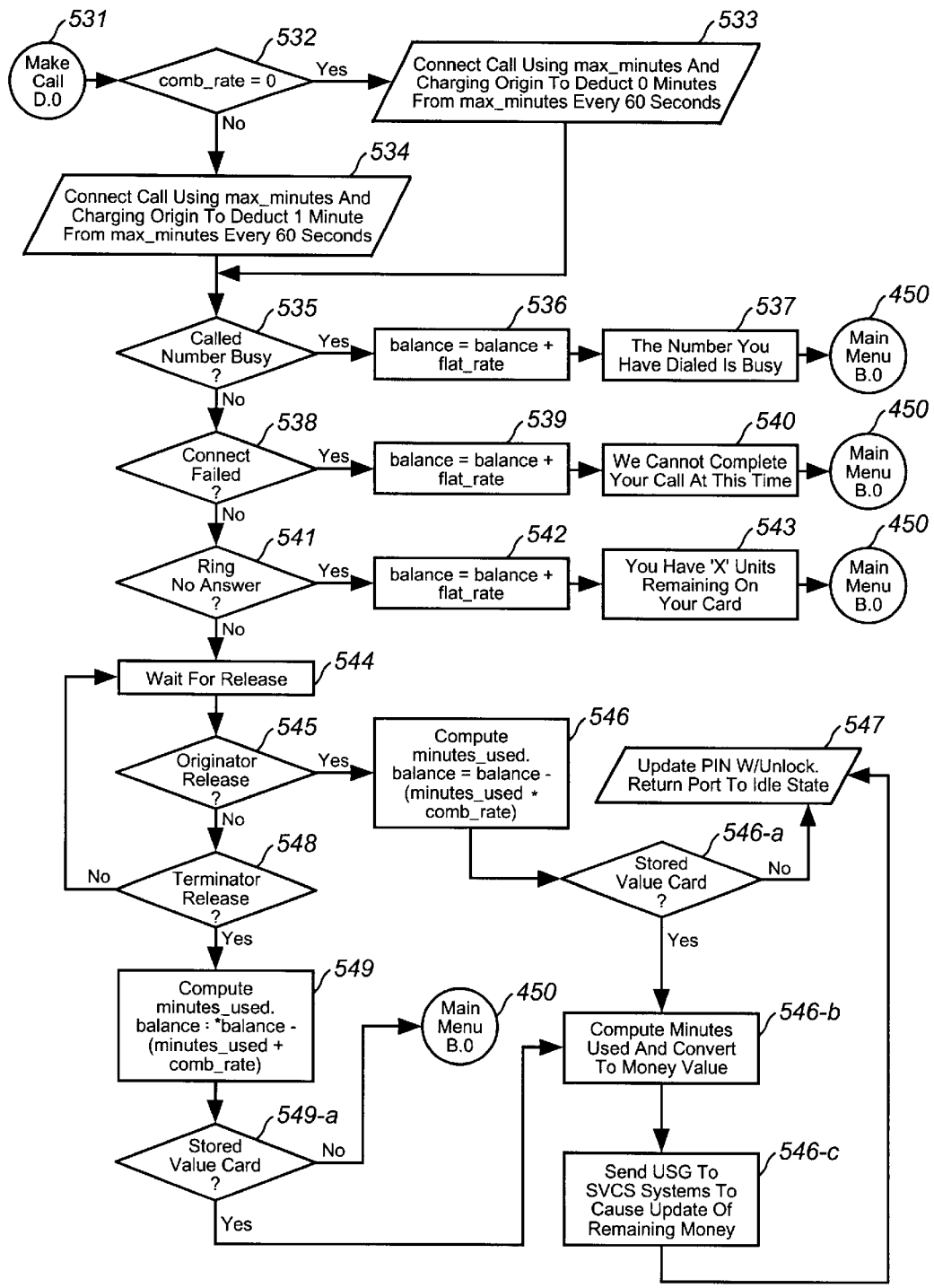
FIG. 2N is a continuation call flow diagram of the call flow diagram started in FIGS. 2A–2M.

The operations and call flows within a system, similar to system 100 (FIG. 1), to facilitate pre-paid card feature setup and card use in accordance with the present invention are illustrated in FIGS. 2A–2N. Such operations are self-explanatory, but are discussed herein to further illustrate the novel aspects of the operations that occur within the present invention. It should be noted that shaded blocks within FIGS. 2A–2N are intended to illustrate exemplary automatic voice prompts, such as those that may be voiced automatically by voice response system 107, for example. Accordingly, other prompts may be used as the present invention is not restricted to that which may be shown in the attached figures or described herein.

Referring now to FIG. 2A, depicted therein is a call flow diagram related to the use of a pre-paid card in accordance with a preferred embodiment of the present invention. FIG. 2A includes steps 301–332. The process steps depicted in FIG. 2A are self-explanatory and, accordingly, are discussed herein in summary. A calling party (e.g., a card user) dials a pre-paid card access number (e.g., a 1-800 access number) to access the pre-paid telephone calling card processing system 104 via the PSTN 102, for example. Based on the access number whence the calling party accesses pre-paid telephone calling card system 104 at step 302, an appropriate language menu at step 303 may need to be provided to the calling party (e.g., for callers in foreign countries, for example). Otherwise, if the calling party is dialing an access number that corresponds to a domestic access number, processing proceeds as otherwise indicated in FIG. 2A and the calling party will be prompted with the various prompts illustrated therein and, in particular, to enter a pre-paid card/PIN number/identifier associated with his pre-paid/stored value card, etc.

If, at step 304, an alternative language is to be used to prompt a calling party in relation to his pre-paid card, processing will proceed to step 303 at the top of FIG. 2D and, in particular, to the steps within FIGS. 2D and 2E. FIGS. 2D and 2E include process steps 382–405 and are intended to illustrate exemplary operations to allow a calling party to select a particular language by which pre-paid telephone calling card processing system 104 will manifest audible voice prompts to a calling party (e.g., French prompts to a French-speaking card user, English prompts for an English-speaking card user, etc.). Those skilled in the art will immediately understand the process steps illustrated in FIGS. 2D and 2E after careful inspection and review of the same. It should be noted, however, that there are references to operator services within FIG. 2D that are illustrated within FIG. 3F as discussed below.

After the calling party is prompted to enter his pre-paid card number (e.g., a 10 digit DTMF string corresponding to a PIN code/card identifier associated with his pre-paid card, etc.), processing will proceed at the top of FIG. 2B to verify the card number (PIN code associated with the pre-paid card) and to allow further processing as indicated therein.

If the ten digit DTMF string of digits entered by the calling party is an invalid string (e.g., one containing only symbols such as multiple "*" and "#" entered via a telephone key pad) and a release did not occur on the telephone call into pre-paid telephone calling card processing system 104, operator service may be automatically initiated at step 331 and processing will then proceed at step 332 at the top of FIG. 2F. In FIG. 2F, process steps 406–427 are illustrated to exemplify operator assistance to a caller who has not entered an appropriate DTMF sequence/string that can correspond to a card number or PIN code associated with a pre-paid card as stored in SDP 106 (FIG. 1).

Depicted in FIG. 2B are process and call flow steps 314, 318, and 338–361. Such process and call flow steps are self-explanatory and accordingly, are discussed herein in summary. In FIG. 2B, the ten-digit PIN code entered by the calling party (also referred to above as the card number/identifier) are verified in relation to PIN data stored in SDP 106 as shown in FIG. 1. If the PIN code is an active PIN code indicating that the pre-paid card is valid and usable (although minutes/units may be depleted) then processing proceeds to step 341 at the top of FIG. 2C.

In FIG. 2C, process steps 362–381 are carried out to further validate the calling party's pre-paid card, for example the pre-paid/stored value card 120. Additionally, the amount of remaining minutes left on the calling party's pre-paid card will be analyzed at step 363 and the calling party will be correspondingly notified as to the balance at steps 364 and 380, respectively. In particular, such analysis of remaining minutes, in accordance with the present invention, may be carried out by requesting and receiving a message from stored value card processing systems (e.g., SVCS 112—FIG. 1) which may be processed to convert a remaining money amount (e.g., dollars) into respective calling units (e.g., minutes). That is, SDP 106 may be configured to query SVCS 112 (FIG. 1) to request a remaining stored money value. In turn, SDP 106 may convert such a remaining stored money value into calling units (e.g., call usage minutes, etc.), which may be used to make one or more telephone calls (e.g., charge calls, etc.). Such a conversion maybe carried out mathematically by dividing a remaining stored money value (e.g., 1 dollar) by a call usage unit rate (e.g., 25 cents per unit) to realize an available amount of call usage units remaining.

If pre-paid/stored value card 120 contains remaining call usage units (e.g., minutes of long distance telephone service, available points, etc.), processing will proceed at the top of FIG. 2H and, in particular, at step 381 illustrated therein.

It is important to note that the present invention will accommodate recharging and, in particular, recharge activation operations to cause an additional number of calling units to be associated with a particular pre-paid card, etc. Accordingly, if at step 364 the calling party is prompted that his pre-paid card has a zero unit balance, processing may proceed through to step 368, and to step 378 to reach customer service, for example, at step 379 as indicated at the top of FIG. 2G. In FIG. 2G, process steps 428–448 illustrate the sequence of operations that may be carried out to have a live operator manually recharge the calling party's pre-paid/stored value card. Such recharge operations are, in actuality, database operations to adjust remaining unit counts or quantities and data stored within SDP 106 (FIG. 1) and/or within SVCS 112 (e.g., by adjusting remaining money values, etc.), for example, which correspond to pre-paid/stored value card 120. A discussion of such recharge operations may be found in co-pending U.S. patent applications Ser. No. 09/089,815, filed Apr. 6, 1998, now abandoned, entitled "POINT OF SALE ACTIVATION AND DEACTIVATION OF PRE-PAID TELEPHONE CALLING CARDS," which is commonly assigned and incorporated herein by reference.

Referring now to FIG. 2H, depicted therein is a decisional call flow diagram related to determining weather pre-paid/stored value card 120 is a normal pre-paid card or one that is also associated with a stored value card. If pre-paid/stored value card 120 actually is a stored value card, processing proceeds to step 451 at the top of FIG. 2I–1. If not, processing proceeds to step 450 at the top of FIG. 2J.

Referring now to FIG. 2I–1, depicted therein is a call flow sequence for messaging between SDP 106 and SVCS 112 in accordance with a preferred embodiment of the present invention. In particular, processing starts at step "a" where SDP 106 will send a request message to SVCS 112 to determine remaining stored money values associated with pre-paid/stored value card 120.

Next, at step "b", a responsive message formatted by SVCS 112 and one that includes an indication of remaining money that will be sent to and SDP 106.

Next, at step "c", SDP 106 and appropriate logic therein may compute/convert remaining money values to call usage units (as described above with regard to FIG. 1)—for example, conversion from a money value into telephone call usage minutes. Alternatively, conversions from money values into available call usage units (at particular call service rates, etc.) may take place within SVCS 112.

Next, at step "d", SDP 106 will determine if call usage units remain available for making one or more telephone calls. If not, processing proceeds to step "e" at the top of FIG. 2I–2. Otherwise, processing proceeds to Main Menu B.0 at the top of FIG. 2J.

Referring now to FIG. 2I–2, the pre-paid/stored value card 120 cannot be used to make calls. As such, an appropriate message will be played/voiced to the calling party to inform of such a situation.

Next, processing proceeds to step 523 in FIG. 2M as discussed below.

Referring now to FIG. 2J, depicted therein is a call flow diagram that includes process steps 475–491. The purpose of such process steps are to prompt the card user with a main menu including announcements allowing corresponding DTMF entries to occur to either access a customer service, or place a call (e.g., a long distance pre-paid telephone calling card call, etc.) in accordance with remaining call units (e.g., minutes, etc.) related to pre-paid/stored value card 120 as stored in SDP 106, for example. At step 477, a main menu is voiced to the calling party (card user). If the calling party elects to make a call as indicated by pressing the "1" key on his DTMF telephone keypad, processing proceeds to step 480 as illustrated at the top of FIG. 2L. The remaining steps within FIG. 2K are self-explanatory and have been addressed with regard to FIGS. 2A–2J as discussed above.

Referring now to FIG. 2K, depicted therein is the start of a call flow that will allow a calling party (card user) to initiate an outbound call in relation to pre-paid/stored value card 120. That call flow is further illustrated in FIGS. 2M–2N and includes process steps 500–549. Such steps will be immediately apparent and understood by those skilled and knowledgeable in the art of pre-paid cards, after careful review of the process steps depicted therein.

Process steps 546-*a* through 546-*c* and 549-*a* are directed to certain features of the present invention that provide or otherwise enable backwards tracking of call unit usage and corresponding debiting of remaining money amounts tracked by SVCS 112 (FIG. 1). That is, the present invention enables SDP 106, after processing a telephone call and after it computes a used call unit amount, to convert such a used call unit amount back to a money value (e.g., a money value corresponding to the number of call units used to make one or more telephone calls, etc.). In turn, SDP 106 may then format and send a message to SVCS 112 to inform the same of the consumed money for the processed telephone call(s). As such, SVCS 112 can then debit a remaining stored money value to reflect a debit for telephone calls. Alternatively, SVCS 112 may perform backwards type mathematical conversions based on message containing calling unit usage statistics received from SDP 106.

It should be noted that it is preferable to cause a lock to be placed on the available money tracked by SVCS 112 during the time that telephone calls are being processed by SDP 116. Such a lock preferably should be done to prevent using a pre-paid/stored value card to simultaneously make purchases of goods and services at the time that telephone calls are being made and vice versa. The placement of such a lock (i.e., such as via flag setting operations performed against databases and records, system variables, etc.) will be immediately understood by those skilled in the art.

Thus, having fully described the present invention by way of example with reference to attached drawing figures, it will be readily appreciated that many changes and modifications may be made to the invention and to any of the exemplary embodiments shown and/or described herein without departing from the spirit or scope of the invention, which is defined in the appended claims.

What is claimed is:

1. A system for facilitating the use of a pre-paid card linked to a stored value card account, comprising:
   a data storage system for storing data related to the pre-paid card and a stored value card account, said stored value card account maintained by a stored value card processing system, said stored value card processing system storing a money value applicable to purchases and telephone calls; and
   a pre-paid telephone calling card processing system coupled to said data storage system and configured to receive a request to initiate a telephone call in relation to the pre-paid card and to instruct said stored value card processing system to adjust said money value in relation to said telephone call.

2. The system of claim 1, wherein said data storage system and said pre-paid telephone calling card processing system are remotely located.

3. The system of claim 1, wherein said telephone calls are long distance type telephone calls.

4. The system of claim 1, wherein said pre-paid telephone calling card processing system is further configured to convert said money value into a number of telephone service units to be used to make said telephone calls.

5. A method of using a pre-paid telephone calling/stored value care, comprising the steps of:
   accessing a pre-paid telephone calling card processing system during a pre-paid telephone calling card call via a telephone network;
   entering a card identifier corresponding to data addressable by said pre-paid telephone calling card processing system, said data corresponding to a stored value card account associated with an amount of spendable money for use against telephone calls and non-telephone purchases;
   accessing said stored value account to retrieve said amount of spendable money; and
   storing said amount of spendable money within said pre-paid telephone calling card processing system so that telephone calls can be made in relation thereto.

6. The method of claim 5, wherein said telephone network is the publicly switched telephone network (PSTN).

7. The method of claim 5, wherein said pre-paid telephone calling card processing system further operates to convert said amount of spendable money into a corresponding number of telephone call usage units.

8. The method of claim 7, wherein said telephone call usage units are minutes.

9. The method of claim 5, wherein said accessing step further comprises the step of communicating with a stored value card processing system to query said stored value card account maintained thereby and to retrieve said amount of spendable money.

10. A system for facilitating the use of a pre-paid telephone calling/stored value card, comprising:

data storage system for storing data corresponding to the pre-paid telephone calling/stored value card; and a pre-paid telephone calling card processing system coupled to said data storage system and configured to receive a request to make an outbound telephone call in relation to the pre-paid card during an access call over a telephone network, to access a stored value card processing system to retrieve a stored value corresponding to a remaining amount of spendable money associated with the pre-paid card and to cause said stored value card processing system to debit said remaining amount of spendable money based on said outbound telephone call.

11. The system of claim 10, wherein said data storage system and said pre-paid telephone calling card processing system are remotely located.

12. The system of claim 10, wherein said outbound call is a long distance telephone call.

13. A method for facilitating the use of a pre-paid card, comprising the steps of:

storing data corresponding to the pre-paid card, the pre-paid card corresponding to a stored value card account maintained by a stored value card processing system wherein said system is capable of adjusting value associated with said pre-paid card to effectuate either a telephone call or a non-telephone call transaction;

receiving a request to make an outbound telephone call during an. access call over a telephone network; and causing said stored value card processing system to adjust a remaining money value stored thereby based on said outbound telephone call.

14. A method of using a pre-paid telephone calling/stored value card, comprising the steps of:

accessing a pre-paid telephone calling card processing system during a telephone service access call via a telephone network;

entering a card identifier corresponding to data addressable by said pre-paid telephone calling card processing system, said data addressable by said pre-paid telephone calling card processing system including a key to corresponding data maintained by a stored value card processing system, said corresponding data including a remaining money value capable of being used for making a telephone call and a non-telephone call purchase;

entering a terminating telephone number to make said telephone call; and automatically initiating an outbound telephone call based on said terminating telephone number and causing said stored value card processing system to adjust said remaining money value based on said telephone call.

15. The method of claim 14, wherein said automatically initiating step comprises causing said stored value card processing system to debit said remaining money value based on said telephone call.

16. The method of claim 14, further comprising the step of converting said remaining money value to telephone service usage units.

17. The method of claim 16, wherein said telephone service usage units are minutes.

\* \* \* \* \*